United States Patent
Fang

(10) Patent No.: US 9,483,633 B2
(45) Date of Patent: Nov. 1, 2016

(54) METHOD AND TERMINAL FOR AUTHENTICATING A STLYUS

(75) Inventor: Wen Fang, Guangdong Province (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/009,322

(22) PCT Filed: Jul. 19, 2011

(86) PCT No.: PCT/CN2011/077316
§ 371 (c)(1),
(2), (4) Date: Oct. 1, 2013

(87) PCT Pub. No.: WO2012/136028
PCT Pub. Date: Oct. 11, 2012

(65) Prior Publication Data
US 2014/0040983 A1     Feb. 6, 2014

(30) Foreign Application Priority Data

Apr. 2, 2011     (CN) .......................... 2011 1 0084008

(51) Int. Cl.
*G06F 21/44*     (2013.01)
*G06F 21/83*     (2013.01)
*G06F 3/0354*    (2013.01)

(52) U.S. Cl.
CPC ......... *G06F 21/445* (2013.01); *G06F 3/03545* (2013.01); *G06F 21/83* (2013.01)

(58) Field of Classification Search
CPC .. G06F 21/83; G06F 3/03545; G06F 21/445; G06F 3/023; G02B 6/0046; G02B 6/0068; G02B 6/0055; G02B 6/0073; G06Q 50/12; G06K 9/00154; H04W 12/06; H04M 1/72577; H04M 1/0202
See application file for complete search history.

(56) References Cited

U.S. PATENT DOCUMENTS

| | | | |
|---|---|---|---|
| 6,882,859 B1 * | 4/2005 | Rao .......................... | G06F 3/023 345/168 |
| 8,439,263 B2 * | 5/2013 | Clark ................. | G08B 13/2462 235/462.01 |
| 2002/0138568 A1 * | 9/2002 | Johansson ............... | G06F 3/038 709/203 |

(Continued)

FOREIGN PATENT DOCUMENTS

CN     101807240 A     8/2010

OTHER PUBLICATIONS

Qin et al. pPen: Enabling Authenticated Pen and Touch Interaction on Tabletop Surfaces, Nov. 7-10, 2010, Saarbr ucken, Germany.*

(Continued)

*Primary Examiner* — Morshed Mehedi
*Assistant Examiner* — Shu Chun Gao
(74) *Attorney, Agent, or Firm* — Koppel, Patrick, Heybl & Philpott

(57) ABSTRACT

Disclosed are a terminal authentication method and a terminal. The authentication method comprises: setting on the terminal a detection device; setting on a stylus a label device capable of being detected by the detection device; the detection device detecting for label information preconfigured in the label device, and authenticating the stylus according to a detection result. Employment of the technical solution of the disclosure solves the technical problems in the related art of the incapability of the terminal to authenticate the stylus.

5 Claims, 3 Drawing Sheets

(56) References Cited

U.S. PATENT DOCUMENTS

| | | | |
|---|---|---|---|
| 2004/0256456 A1* | 12/2004 | Coughlin et al. | 235/382 |
| 2006/0224305 A1* | 10/2006 | Ansari et al. | 701/202 |
| 2006/0250374 A1* | 11/2006 | Morita | G06F 3/0488 345/173 |
| 2008/0280646 A1* | 11/2008 | Poo | G06F 3/03545 455/556.2 |
| 2010/0007511 A1* | 1/2010 | Ina et al. | 340/825 |

OTHER PUBLICATIONS

International Search Report (Form PCT/ISA/210) for PCT/CN2011/077316, mailed Jan. 19, 2012.

* cited by examiner

METHOD AND TERMINAL FOR AUTHENTICATING A STLYUS

TECHNICAL FIELD

The disclosure relates to the communication field, and in particular to a terminal authentication method and a terminal.

BACKGROUND

With the development of electronic technology, there are various electronic devices on the market, and currently many electronic devices support stylus operation, such as touchscreen mobile phones, the application of touchscreen mobile phones is more and more diverse, but currently most touchscreen mobile phones cannot authenticate the stylus and commonly support the operation of any stylus, which thus causes safety hazard in mobile phones.

SUMMARY

In view of this, the disclosure is to provide a terminal authentication method and a terminal, for solving the technical problem in the related art of the incapability of the terminal to authenticate the stylus.

The following technical solution is adopted by the disclosure:

a terminal authentication method, comprising:

setting a detection device on a terminal, and setting a label device, which is capable of being detected by the detection device, on a stylus; and the detection device detecting for label information preconfigured in the label device, and authenticating the stylus according to a detection result.

In the above-mentioned method, the detection device detecting for label information preconfigured in the label device and authenticating the stylus according to the detection result is embodied as:

the detection device reading the label information preconfigured in the label device, and matching the read label information with authentication information preconfigured in the terminal;

if the match result is that the read label information is consistent with the authentication information preconfigured in the terminal, then the terminal allowing to respond to an operation of the stylus; and if the match result is that the read label information is inconsistent with the authentication information preconfigured in the terminal, then the terminal rejecting to respond to the operation of the stylus.

In the above-mentioned method, the detection device reading the label information preconfigured in the label device is embodied as: the detection device non-contactly reading the label information preconfigured in the label device or the detection device contactly reading the label information preconfigured in the label device.

In the above-mentioned method, the authentication information is information for authenticating one or more styluses.

A terminal, comprising a detection device, is configured to detect for label information preconfigured in a label device set on a stylus, and authenticate the stylus according to a detection result.

In the above-mentioned terminal, the detection device is an RFID reader or an NFC reader.

In the above-mentioned terminal, the terminal is further set thereon with a control module for enabling and/or disabling an authentication function.

The disclosure provides a stylus, comprising a label device capable of being detected by a terminal, wherein the label device is configured to preconfigure label information of the stylus which is used by the terminal to authenticate the stylus.

In the above-mentioned stylus, the label device is an electronic chip.

In the above-mentioned stylus, the electronic chip is an RFID chip or an NFC chip.

In the terminal authentication method and terminal provided according to the disclosure, by way of setting a detection device on the terminal body and setting on the stylus a label device capable of being detected by the detection device of the terminal and adopting the detection device to read the label information preconfigured in the label device to finally achieve the purpose of authenticating the stylus, the technical problem in the related art of incapability of the terminal to authenticate the stylus is solved, and a novel terminal using safety protection technical solution is provided.

DETAILED DESCRIPTION OF THE EMBODIMENTS

The basic concept of the disclosure is: setting on a terminal a detection device, setting on a stylus a label device capable of being detected by the detection device, the detection device detecting for label information preconfigured in the label device, and authenticating the stylus according to a detection result.

Hereinafter, a detailed description is given to the embodiments of the disclosure with reference to the accompanying drawings.

Embodiment 1

Figure 1:
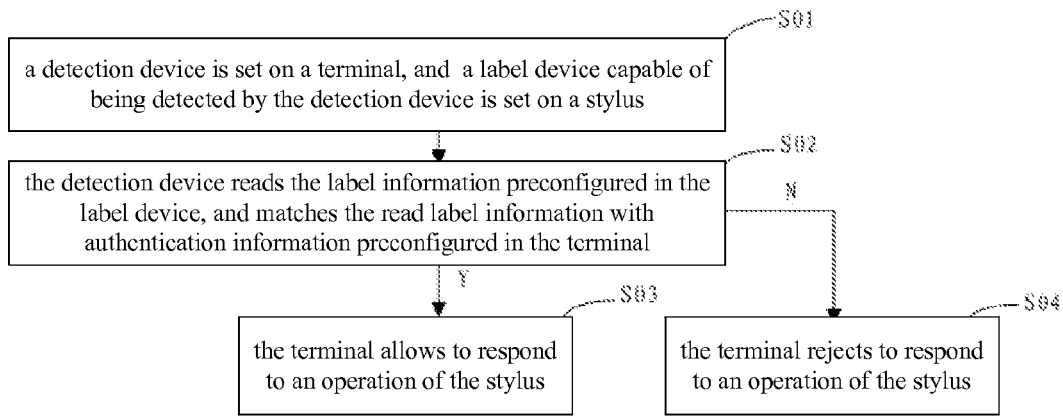
FIG. 1 is a flowchart of a terminal authentication method according to an embodiment of the disclosure.

FIG. 1 is a flowchart of a terminal authentication method according to an embodiment of the disclosure, and as shown in FIG. 1, the method includes the following steps:

S01, a detection device is set on a terminal, and a label device capable of being detected by the detection device is set on a stylus.

S02, the detection device reads the label information preconfigured in the label device and matches the read label information with authentication information preconfigured in the terminal, and if the match result is that they are consistent with each other, perform S03, and if the match result is that they are inconsistent with each other, perform S04.

S03, the terminal allows to respond to an operation of the stylus.

S04, the terminal rejects to respond to an operation of the stylus.

Figure 2:
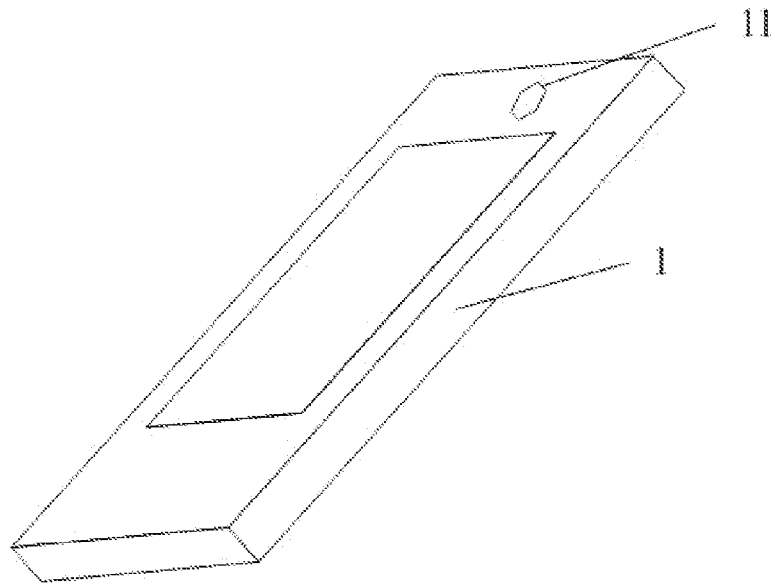
FIG. 2 is a schematic diagram of a terminal according to an embodiment of the disclosure.

FIG. 2 is a schematic diagram of a terminal according to an embodiment of the disclosure, and as shown in FIG. 2, a terminal 1 is set thereon with a detection device 11, and the detection device 11 is configured to detect for label information preconfigured in a label device set on a stylus and authenticating the stylus according to a detection result.

The terminal in this embodiment includes mobile phone, MP3 player, MP4 player, and so on, but not limited to the listed. The method for the detection device to read the label information preconfigured in the label device in this embodiment includes one of contactless reading and contact reading, and the preferred method is contactless reading, which preferably is: setting on the terminal a radio frequency identification (RFID) reader or a near field communication (NFC) reader as the detection device, correspondingly setting on the stylus an RFID chip or an NFC chip as the label device; the method for setting the RFID chip or the NFC chip on the stylus includes methods such as embedding or outside adhering and so on; taking setting on the terminal the RFID reader as the detection device and correspondingly setting on the stylus the RFID chip as the label device as an example, the RFID reader continuously emits a radio frequency signal with a specific frequency through an antenna, which forms an electromagnetic field in a certain range of the RFID reader, and after the RFID chip enters into the electromagnetic field, the internal circuit is excited to produce a sensing current, acquires energy from the sensing current, and sends the label information stored in the RFID chip to the outside, and the RFID reader acquires the label information through the antenna, and reads the label information of the stylus preconfigured in the RFID chip, which label information includes unique identification information of the stylus where it is located.

Preferably, during the process that the stylus operates the terminal, the stylus may be authenticated continuously or with an interval, so as to prevent other stylus continuously operating the terminal and leaking the user information.

Preferably, after the stylus has passed the authentication, if the stylus does not perform any operation on the terminal within a certain period of time, the terminal can be configured to automatically disable the function of responding to the stylus, and if the stylus is intended to continuously operate the terminal, it has to be authenticated again.

Preferably, when the user closes the screen, the terminal can automatically disable the function of responding to the stylus, and the stylus will be re-authenticated at next time.

Figure 3:
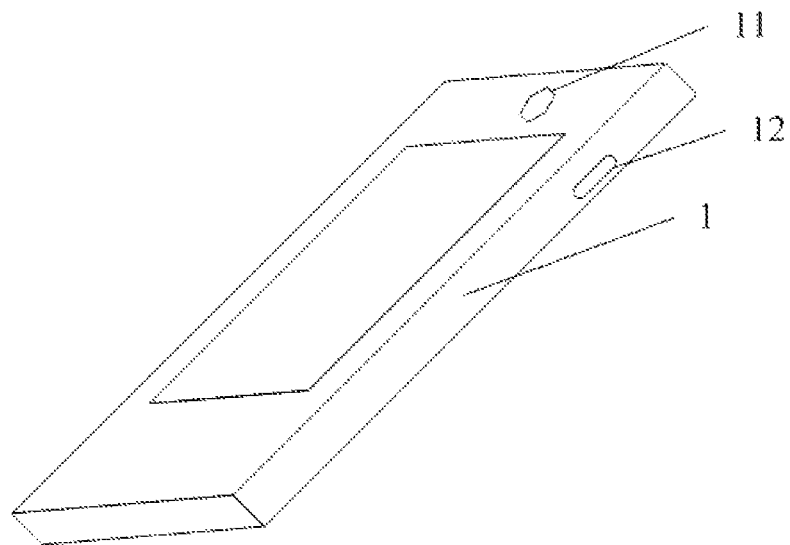
FIG. 3 is a schematic diagram of a terminal according to another embodiment of the disclosure.
Figure 4:
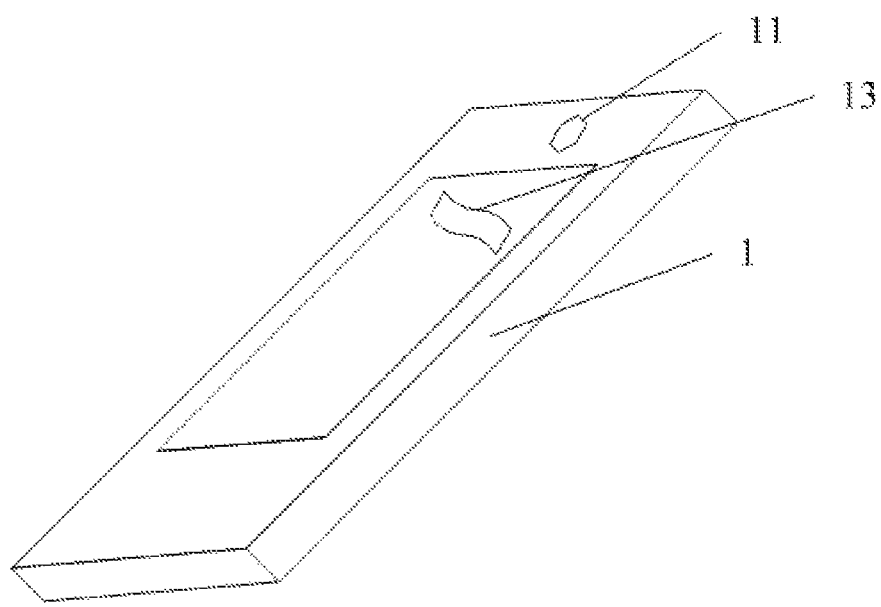
FIG. 4 is a schematic diagram of a terminal according to another embodiment of the disclosure.

Preferably, an easy operation method can be configured in the terminal so that the user conveniently starts up the stylus authentication process, for example, a control module for enabling and/or disabling the authentication function can be configured in the terminal, the control module includes a plurality of implementations, it can be a key, or an authentication response region can be configured on the screen, and so on. There are many kinds of keys, for example, a method of multiplexing a combination of some existing keys of the terminal and long-time press-down, for example, a method for specially configuring a key for enabling and/or disabling the authentication function, please refer to FIG. 3, FIG. 3 is a schematic diagram of a terminal according to another embodiment of the disclosure: a terminal 1 is set thereon with a detection device 11 and is also set thereon with a key 12 for enabling and/or disabling the authentication function. In a normal standby state, the user presses down the key to enable the authentication function, and the RFID reader set in the terminal starts to emit an electromagnetic field and prepares to read label information fed back by an RFID label, and this key can also be used to disable the authentication function according to the demand of the user him/herself. An authentication control touchscreen region is set on the screen, please refer to FIG. 4, FIG. 4 is a schematic diagram of a terminal in another embodiment of the disclosure: a terminal 1 is set thereon with a detection device 11 and is also set thereon with an authentication control touchscreen region 13 for enabling and/or disabling the authentication function, and the user can fill the blank region according to the prompt of the terminal in accordance with a certain track or a target sliding block to operate the touchscreen so as to realize the enabling and/or disabling of the authentication function.

Preferably, the authentication information preconfigured in the terminal includes information for authenticating one or more styluses, and a stylus addition/deletion module can be set in the terminal, through which information for authenticating a plurality of styluses can be pre-stored in the terminal and the user can be allowed to add other styluses which can respond to the terminal, so as to prevent the problem that the user cannot operate the terminal after losing a specific stylus; and in order to prevent a non-terminal user adding a stylus which can respond arbitrarily, when the user starts up this function through the menu, the terminal can instruct the user to input the password first and start this function only if the password is correct, when the user inputs the correct password, the detection device of the terminal, such as the RFID reader, emits a driving electromagnetic field and starts to read the new label information, if the label information is not read out within a certain period of time, it will be timed out and exit, and if the new label information of the stylus is read within a certain period of time, the label information can be stored in the terminal as new stylus information and used as authentication information for authenticating the stylus subsequently.

When the terminal can respond to a plurality of styluses, a stylus list can be configured in the terminal, and after the detection device of the terminal reads the label information of the stylus, it matches the label information with the information of a first stylus in the stylus list of the terminal, if the matching has failed, it continues to match same with the information of other styluses in the list, if the matching succeeds, the terminal deems that this stylus is one to which the user allows to respond, the terminal starts to correspondingly respond to the input of the stylus, and if there is no stylus information which matches successfully after the matching of all the information is done, the terminal deems that this stylus is one to which the user does not allow to respond, and the terminal rejects to respond to any operation of this stylus.

Accordingly, this addition/deletion stylus module can also be configured to allow the user to delete some styluses which can be authenticated and respond normally at present under a certain condition such as the correct password is input so that they cannot be responded by the terminal continuously.

For further improving the user experience, when adding new stylus information in the terminal, the user can also be prompted to make specific personalized settings for this stylus, for example, setting a stylus management module in the terminal, which module has functions such as renaming the stylus, adding a display picture, setting a group, setting a response ring, setting an authentication pass prompt sound, setting an application scenario mode and so on.

If the user has set a name for a stylus, and set a corresponding picture, response ring, authentication pass prompt sound for the stylus, when passing the authentication, the preset authentication pass prompt sound can be played, and the name and picture of this stylus can be displayed in a specific location, and the preset respond ring can be played during the operation of the stylus.

If the user has preset a scenario mode corresponding to the use of the stylus, for example, when using a certain stylus, the terminal changes to a mute mode or a corresponding special telephone, clock ring and so on, then after the stylus passes the authentication, the terminal automatically switches to the corresponding scenario mode. If the user has preset a wallpaper, desktop, ring and so on corresponding to this stylus, then after the stylus passes the authentication, the terminal automatically switches to the corresponding wallpaper, desktop and ring. If the user has preset a call control corresponding to this stylus, for example, any call will not be answered but transferred to a certain number when using a certain stylus, then after the stylus passes the authentication, the terminal automatically enable the function of corresponding call control. If the user has preset a black/white list corresponding to this stylus, then after the stylus passes the authentication, the terminal automatically starts up this black/white list. The stylus authentication can also be combined with the screen unlock operation of the terminal, for example, the screen is unlocked automatically after the authentication succeeds. For the terminal, these personalized settings can be deleted when deleting the stylus, and can also be recovered when recovering the stylus.

Figure 5:
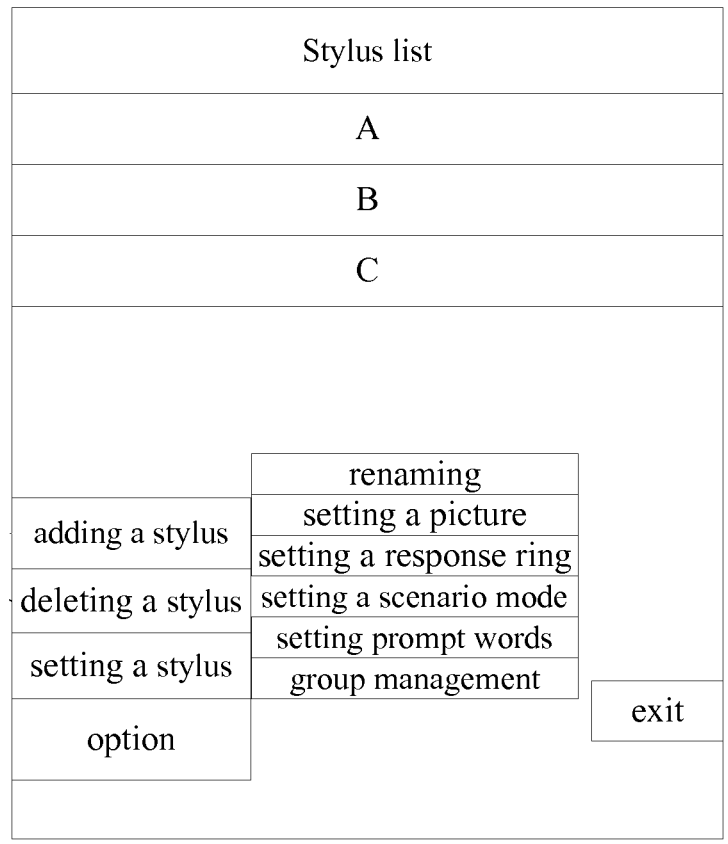
FIG. 5 is a schematic diagram of a stylus management interface on a terminal according to an embodiment of the disclosure.

FIG. 5 is a schematic diagram of a stylus management interface in a terminal in an embodiment of the disclosure, and as shown in FIG. 5: the stylus management interface includes a stylus list, an option menu and an exit menu, the stylus list is used for listing the names of the styluses to which the terminal can respond, such as A, B and C, the option menu includes options of adding a stylus, deleting a stylus and setting a stylus and so on, which can be displayed by way of setting a pull-down menu in the option menu, and after clicking the option of setting a stylus, the following options can be entered by way of setting a pull-down menu in the stylus option menu:

1) renaming a stylus: modifying the display name of a selected stylus.

2) setting a picture: resetting the display picture of the selected stylus.

3) setting a response ring: resetting the operation response ring of the selected stylus.

4) setting a scenario mode: setting a scenario mode to which the terminal automatically switches when using a certain stylus.

5) setting prompt words: setting the personalized prompt words which are displayed automatically on the terminal interface when using a certain stylus.

6) group management: grouping the existing styluses and managing same accordingly.

The stylus management interface of the terminal in this embodiment is not limited to the abovementioned implementation.

Figure 6:
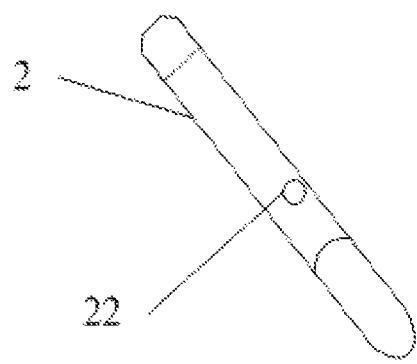
FIG. 6 is a schematic diagram of a stylus according to an embodiment of the disclosure.

FIG. 6 is a schematic diagram of a stylus in an embodiment of the disclosure, and as shown in FIG. 6, the stylus 2 is set thereon with a label device 22 capable of being detected by a terminal, the label device is preconfigured therein with label information of the stylus, which label information is used for authenticating the stylus by the terminal, and the label device is not limited to an electronic chip, which preferably is one of an RFID chip or an NFC chip.

The foregoing is a further detailed description made to the disclosure in conjunction with particular implementations, which shall not be deemed that the particular implementation of the disclosure is merely limited to these descriptions. For a person skilled in the art of the disclosure, several simple deductions or alternations can be made without departing from the concept of the disclosure, which shall be regarded as the protection scope of the disclosure.

What is claimed is:

1. A method for authenticating a stylus by a terminal, comprising:

setting a detection device on a terminal, and setting a label device, which is capable of being detected by the detection device, on the stylus; and the detection device detecting for label information preconfigured in the label device, and authenticating the stylus according to a detection result;

wherein the method further comprises at least one of the following: renaming the stylus, adding a display picture for the stylus, setting a group for the stylus, setting a response ring for the stylus, setting an authentication pass prompt sound for the stylus, setting an application scenario mode for the stylus;

wherein renaming the stylus, adding a display picture for the stylus, setting a group for the stylus, setting a response ring for the stylus, setting an authentication pass prompt sound for the stylus, setting an application scenario mode for the stylus comprise: if the user having set a name for a stylus, and setting a corresponding picture, response ring, authentication pass prompt sound for the stylus, when passing the authentication, the preset authentication pass prompt sound being played, and the name and picture of the stylus being displayed in a specific location, and the preset respond ring being played during the operation of the stylus, if the user having preset a scenario mode corresponding to the use of the stylus, after the stylus passing the authentication, the terminal automatically switching to the corresponding scenario mode, if the user having preset a wallpaper, desktop, ring and so on corresponding to the stylus, then after the stylus passing the authentication, the terminal automatically switching to the corresponding wallpaper, if the user having preset a call control corresponding to the stylus, then after the stylus passing the authentication, the terminal automatically enabling the function of corresponding call control, if the user having preset a black/white list corresponding to the stylus, then after the stylus passing the authentication, the terminal automatically starting up the black/white list;

wherein the detection device detecting for the label information preconfigured in the label device and authenticating the stylus according to the detection result comprises:

the detection device reading the label information preconfigured in the label device, and matching the read label information with authentication information preconfigured in the terminal;

if the match result is that the read label information is consistent with the authentication information preconfigured in the terminal, then the terminal allowing to respond to an operation of the stylus; and if the match result is that the read label information is inconsistent with the authentication information preconfigured in the terminal, then the terminal rejecting to respond to the operation of the stylus; and the authentication information is information for authenticating one or more styluses; and the detection device reading the label information preconfigured in the label device comprises: the detection device contactly reading the label information preconfigured in the label device.

2. A terminal, comprising a detection device, wherein the detection device is configured to detect for label information preconfigured in a label device set on a stylus and authenticate the stylus according to a detection result, wherein the detection device is an NFC reader;

wherein the terminal is further configured to do at least one of the following: rename the stylus, add a display picture for the stylus, set a group for the stylus, set a response ring for the stylus, set an authentication pass prompt sound for the stylus, set an application scenario mode for the stylus;

wherein rename the stylus, add a display picture for the stylus, set a group for the stylus, set a response ring for the stylus, set an authentication pass prompt sound for the stylus, set an application scenario mode for the stylus comprise: if the user has set a name for a stylus, and sets a corresponding picture, response ring, authentication pass prompt sound for the stylus, when passing the authentication, the preset authentication passes prompt sound being played, and the name and picture of the stylus can be displayed in a specific location, and the preset respond ring can be played during the operation of the stylus, if the user has preset a scenario mode corresponding to the use of the stylus, after the stylus passing the authentication, the terminal automatically switches to the corresponding scenario mode, if the user has preset a wallpaper, desktop, ring and so on corresponding to the stylus, then after the stylus passing the authentication, the terminal automatically switches to the corresponding wallpaper, if the user has preset a call control corresponding to the stylus, then after the stylus passing the authentication, the terminal automatically enables the function of corresponding call control, if the user has preset a black/white list corresponding to the stylus, then after the stylus passing the authentication, the terminal automatically starts up the black/white list.

3. The terminal according to claim 2, wherein the terminal is further set thereon with a control module for enabling and/or disabling an authentication function.

4. A stylus, comprising a label device capable of being detected by a terminal, wherein the label device is configured to preconfigure label information of the stylus which is used by the terminal to authenticate the stylus;

wherein the label device is an electronic chip and the electronic chip is an NFC chip; and the stylus is further configured to do at least one of the following: rename the stylus, add a display picture for the stylus, set a group for the stylus, set a response ring for the stylus, set an authentication pass prompt sound for the stylus, set an application scenario mode for the stylus;

wherein rename the stylus, add a display picture for the stylus, set a group for the stylus, set a response ring for the stylus, set an authentication pass prompt sound for the stylus, set an application scenario mode for the stylus comprise: if the user has set a name for a stylus, and sets a corresponding picture, response ring, authentication pass prompt sound for the stylus, when passing the authentication, the preset authentication passes prompt sound being played, and the name and picture of the stylus can be displayed in a specific location, and the preset respond ring can be played during the operation of the stylus, if the user has preset a scenario mode corresponding to the use of the stylus, after the stylus passing the authentication, the terminal automatically switches to the corresponding scenario mode, if the user has preset a wallpaper, desktop, ring and so on corresponding to the stylus, then after the stylus passing the authentication, the terminal automatically switches to the corresponding wallpaper, if the user has preset a call control corresponding to the stylus, then after the stylus passing the authentication, the terminal automatically enables the function of corresponding call control, if the user has preset a black/white list corresponding to the stylus, then after the stylus passing the authentication, the terminal automatically starts up the black/white list.

5. The terminal according to claim 2, wherein the terminal is further set thereon with a control module for enabling and/or disabling an authentication function.

\* \* \* \* \*